United States Patent
Luo et al.

(10) Patent No.: US 11,735,205 B2
(45) Date of Patent: Aug. 22, 2023

(54) AUDIO LOGGING FOR MODEL TRAINING AND ONBOARD VALIDATION UTILIZING AUTONOMOUS DRIVING VEHICLE

(71) Applicant: Baidu USA LLC, Sunnyvale, CA (US)

(72) Inventors: Qi Luo, Sunnyvale, CA (US); Kecheng Xu, Sunnyvale, CA (US); Hongyi Sun, Sunnyvale, CA (US); Wesley Reynolds, Sunnyvale, CA (US); Zejun Lin, New York, NY (US); Wei Wang, Buffalo, NY (US); Yu Cao, Sunnyvale, CA (US); Weiman Lin, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 243 days.

(21) Appl. No.: 17/248,172

(22) Filed: Jan. 12, 2021

(65) Prior Publication Data
US 2022/0223169 A1 Jul. 14, 2022

(51) Int. Cl.
*G10L 25/51* (2013.01)
*G06N 20/00* (2019.01)
(Continued)

(52) U.S. Cl.
CPC ............ *G10L 25/51* (2013.01); *G05D 1/0221* (2013.01); *G05D 1/0255* (2013.01); *G06N 20/00* (2019.01);
(Continued)

(58) Field of Classification Search
CPC .... G10L 25/51; G05D 1/0221; G05D 1/0255; G05D 1/0246; G05D 2201/0213;
(Continued)

(56) References Cited

U.S. PATENT DOCUMENTS

2019/0228305 A1 7/2019 Lovison et al.
2019/0317507 A1* 10/2019 Zhang .................. G05D 1/0214
(Continued)

FOREIGN PATENT DOCUMENTS

JP 2000352993 A 12/2000
JP 2019182412 A 10/2019
(Continued)

*Primary Examiner* — Akelaw Teshale
(74) *Attorney, Agent, or Firm* — Womble Bond Dickinson (US) LLP

(57) ABSTRACT

Systems and methods for generating labelled audio data and onboard validation of the labelled audio data utilizing an autonomous driving vehicle (ADV) while the ADV is operating within a driving environment are disclosed. The method includes recording a sound emitted by an object within the driving environment of the ADV, and converting the recorded sound into audio samples. The method further includes labelling the audio samples, and refining the labelled audio samples to produce refined labelled audio
(Continued)

data. The refined labelled audio data is utilized to subsequently train a machine learning algorithm to recognize a sound source during autonomous driving of the ADV. The method further includes generating a performance profile of the refined labelled audio data based at least on the audio samples, a position of the object, and a relative direction of the object. The position of the object and the relative direction of the object are determined by a perception system of the ADV.

21 Claims, 8 Drawing Sheets

(51) Int. Cl.
  *G05D 1/02* (2020.01)
  *G07C 5/08* (2006.01)
  *G08G 1/01* (2006.01)
(52) U.S. Cl.
  CPC ............ *G07C 5/0808* (2013.01); *G08G 1/01* (2013.01); *G05D 1/0246* (2013.01); *G05D 2201/0213* (2013.01)
(58) Field of Classification Search
  CPC ........ G06N 20/00; G07C 5/0808; G08G 1/01; G08G 1/166; G08G 1/0965; G06F 30/15; G06F 30/20; G06F 2119/02; B60W 40/02; B60W 60/001; B60W 60/0053; B60W 2050/0005; B60W 2050/005; B60W 2050/0057; B60W 2050/007; B60W 2554/4041; B60W 2554/4044; G01S 3/8083
  See application file for complete search history.

(56) References Cited

U.S. PATENT DOCUMENTS

| | | | | |
|---|---|---|---|---|
| 2020/0031337 | A1* | 1/2020 | Soltanian | G06V 20/58 |
| 2020/0209882 | A1* | 7/2020 | Kashi | G10K 11/178 |
| 2020/0241552 | A1* | 7/2020 | Leenayongwut | H04R 3/005 |
| 2021/0027629 | A1* | 1/2021 | Tao | G08G 1/166 |
| 2021/0173408 | A1* | 6/2021 | Luo | G05D 1/0255 |
| 2021/0302621 | A1* | 9/2021 | Brown | G01W 1/10 |
| 2021/0402942 | A1* | 12/2021 | Torabi | B60W 50/14 |
| 2022/0024484 | A1* | 1/2022 | Armstrong-Crews | B60W 40/02 |
| 2022/0057796 | A1* | 2/2022 | Yang | B60W 60/0057 |
| 2022/0132263 | A1* | 4/2022 | Kim | H04S 7/307 |
| 2022/0157165 | A1* | 5/2022 | Dantrey | G06N 3/047 |
| 2022/0383883 | A1* | 12/2022 | Gupta | G10L 25/51 |
| 2022/0386028 | A1* | 12/2022 | Reinmuth | H04R 3/005 |

FOREIGN PATENT DOCUMENTS

| | | |
|---|---|---|
| JP | 2020044930 A | 3/2020 |
| JP | 2020521660 A | 7/2020 |
| JP | 2020525885 A | 8/2020 |

\* cited by examiner

US 11,735,205 B2

AUDIO LOGGING FOR MODEL TRAINING AND ONBOARD VALIDATION UTILIZING AUTONOMOUS DRIVING VEHICLE

TECHNICAL FIELD

Embodiments of the present disclosure relate generally to operating autonomous driving vehicles. More particularly, embodiments of the disclosure relate to audio logging for model training and onboard validation utilizing an autonomous driving vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Same motion planning and control is applied to all types of vehicles, which may not be accurate and smooth under some circumstances.

In addition, the operations of motion planning and control generally require perception of surrounding obstacles or objects, and listening or detection of sound sources within a driving environment. Thus, obstacle identification and sound source identification would require labelling of data (e.g., sensor data) in order to train and test the data for machine learning models.

Unfortunately, data labelling is manually performed by humans, and due to the inherent defects of human beings, manually labelled data is not very accurate, which in turn affects the accuracy of the models.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to one aspect, a method of generating labelled audio data and onboard validation of the labelled audio data utilizing an autonomous driving vehicle (ADV) while the ADV is operating within a driving environment is described. The method includes recording a sound emitted by an object within the driving environment of the ADV, and converting the recorded sound into audio samples. The method further includes labelling the audio samples, and refining the labelled audio samples to produce refined labelled audio data. The refined labelled audio data is utilized to subsequently train a machine learning algorithm to recognize a sound source during autonomous driving of the ADV. The method further includes generating a performance profile of the refined labelled audio data based at least on the audio samples, a position of the object, and a relative direction of the object. The position of the object and the relative direction of the object are determined by a perception system of the ADV.

According to another aspect, a method for onboard validation of labelled audio data utilizing an ADV while the ADV is operating within a driving environment is described. The method includes recording a sound emitted by an obstacle within the driving environment of the ADV to create audio samples. The method further includes determining a position of the obstacle and a relative direction of the obstacle based on sensors data provided by visual sensors of the ADV. The method further includes using the audio samples, the position of the obstacle, and the relative direction of the obstacle to generate a performance profile of refined labelled audio data. The refined labelled audio data is generated by labelling the audio samples and refining the labelled audio samples. The refined labelled audio data is also utilized to subsequently train a machine learning algorithm to recognize a sound source during autonomous driving of the ADV.

Figure 1:
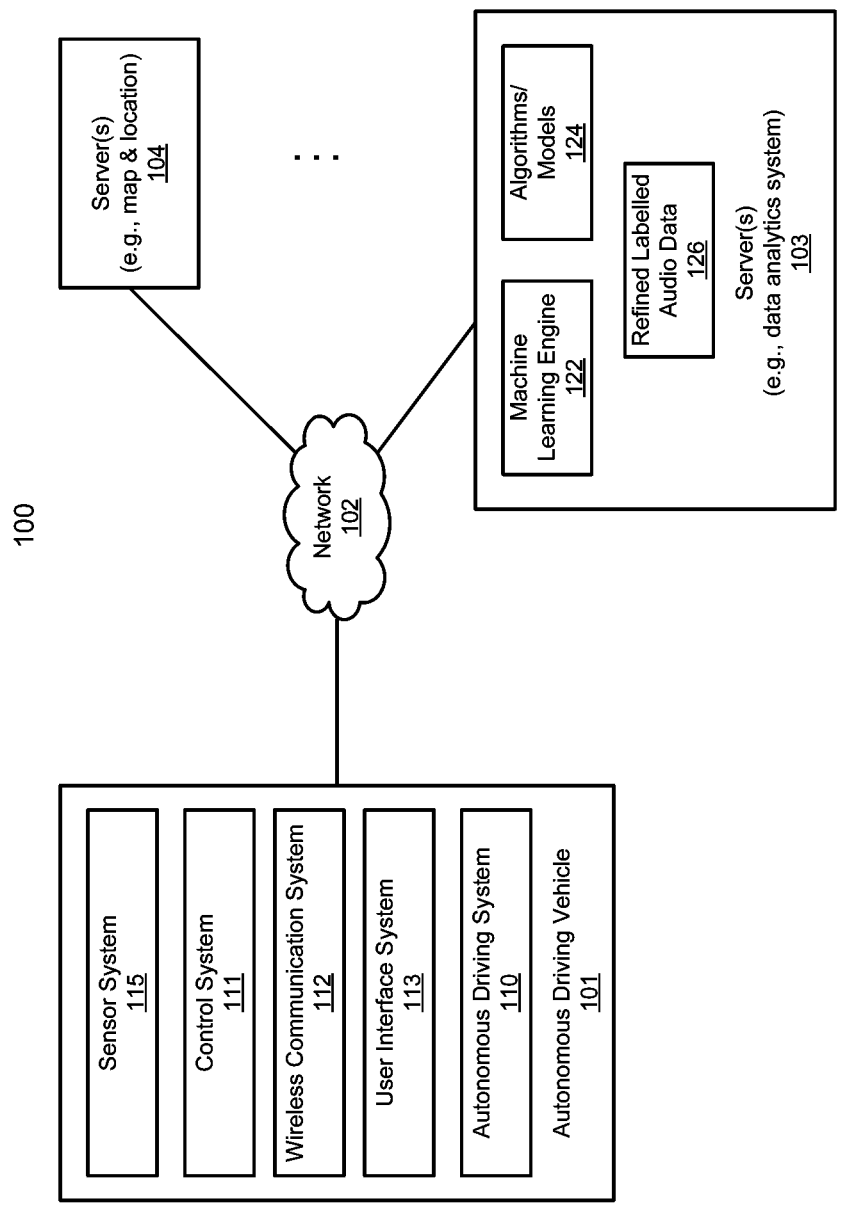
FIG. 1 is a block diagram illustrating a networked system according to one embodiment.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
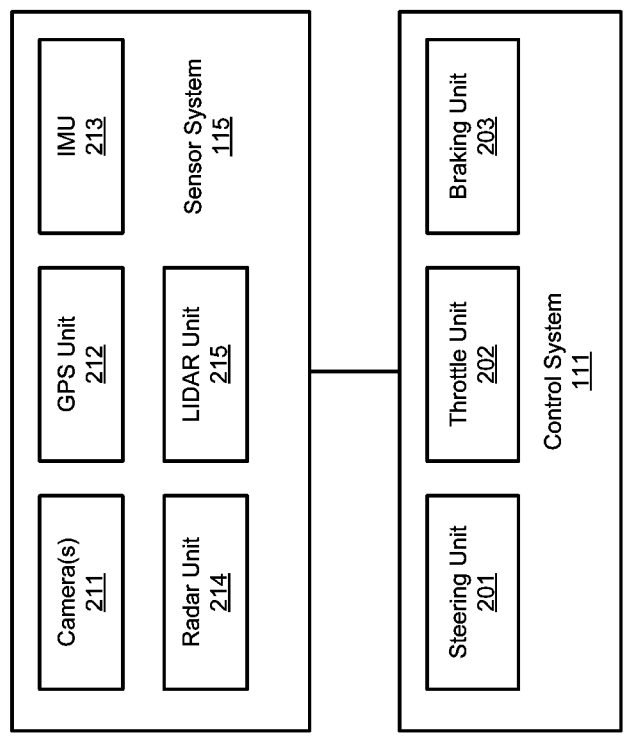
FIG. 2 is a block diagram illustrating an example of an autonomous driving vehicle (ADV) according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes machine learning engine 122. Based on refined labelled audio data 126 (described in more detail herein below), machine learning engine 122 generates or trains a set of rules, algorithms, and/or predictive models 124 for a variety of purposes, such as recognition of a sound source for motion planning and control. Algorithms 124 can then be uploaded on ADVs to be utilized during autonomous driving in real-time. As described in more detail herein below, refined labelled audio data 126 may include, but not limited to, audio samples of a sound source, one or more positions of the sound source, a direction of the sound source, an audio sample identifier (ID), etc.

Figure 3A:
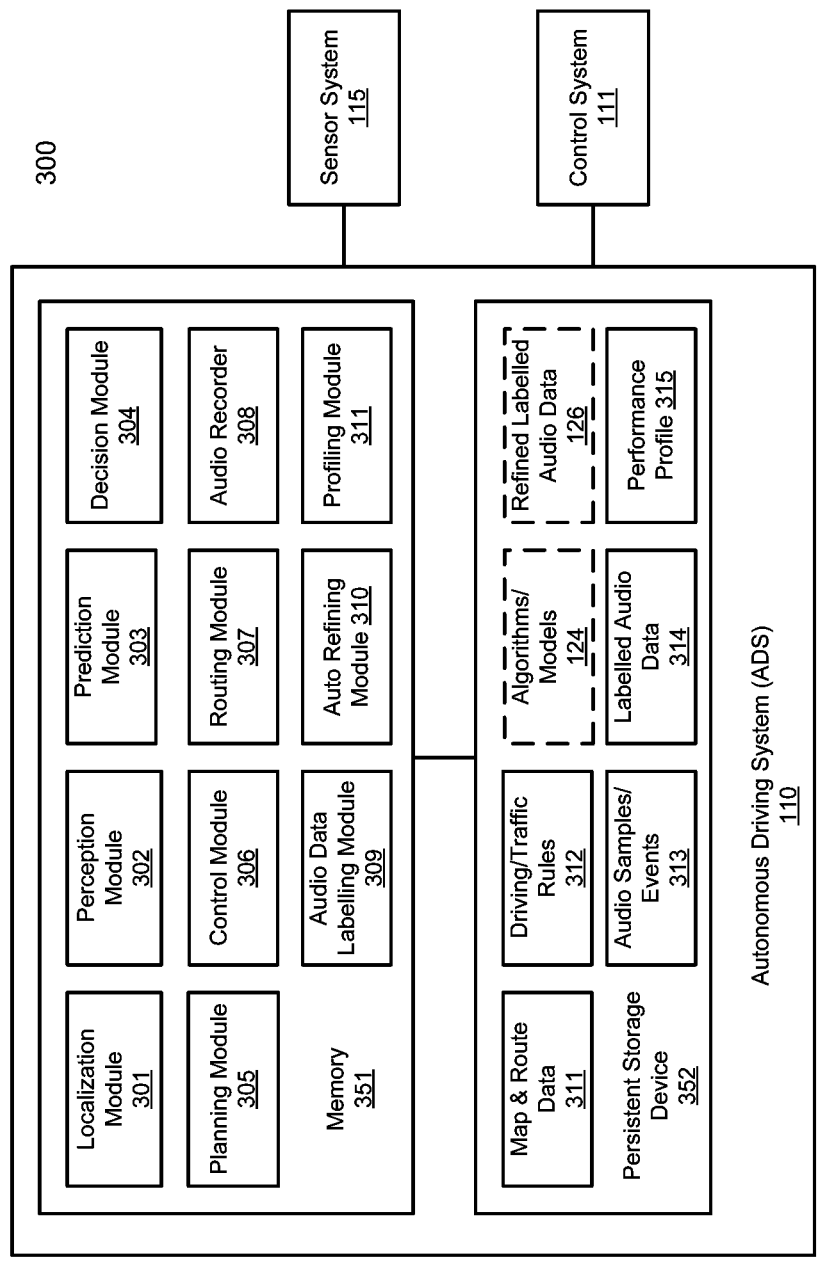
FIGS. 3A-3B are block diagrams illustrating an example of an autonomous driving system used with an autonomous driving vehicle according to one embodiment.
Figure 3B:
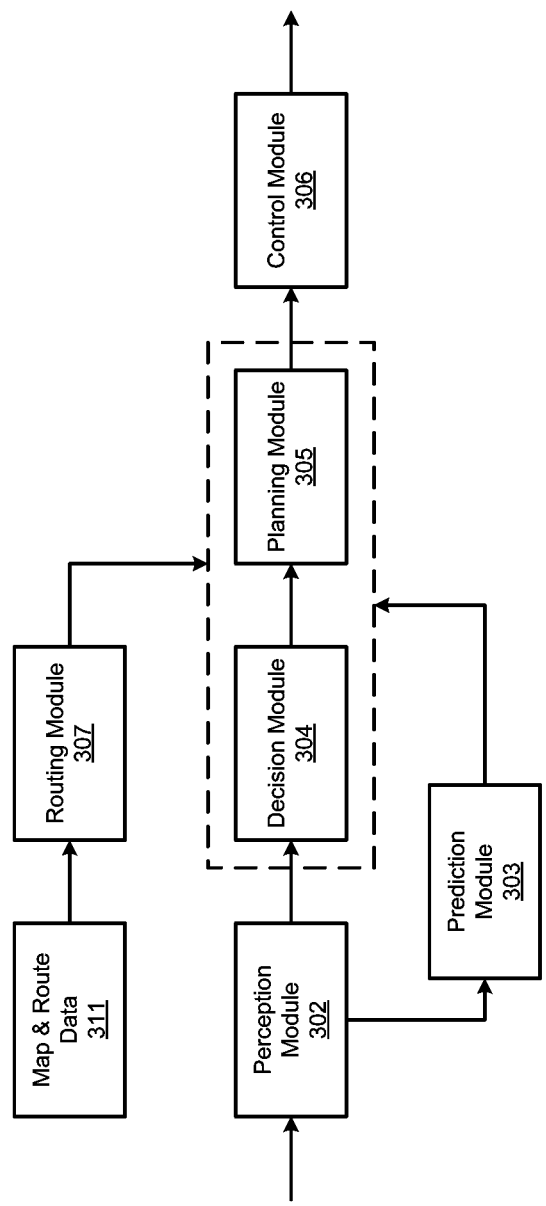

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307, audio recorder 308, manual audio data labelling module 309, auto refining module 310, and profiling module 311.

Some or all of modules 301-311 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-311 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Figure 4:
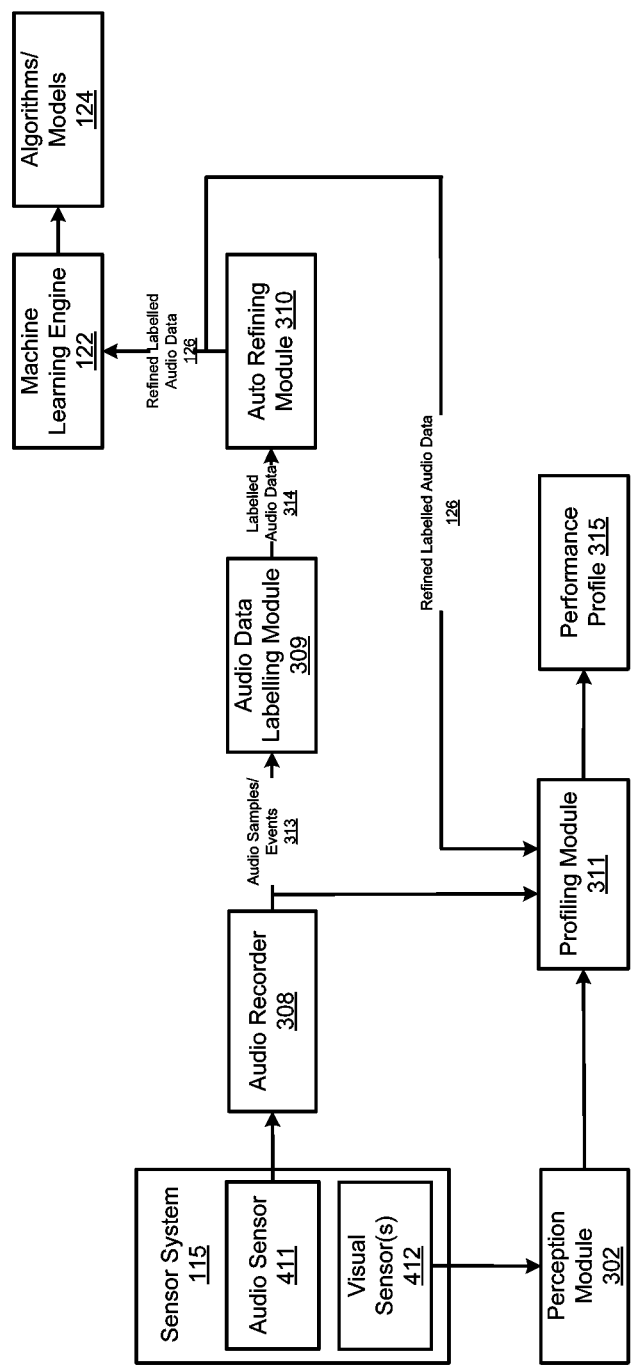
FIG. 4 is a block diagram illustrating a system for audio logging and onboard validation using an autonomous driving vehicle according to one embodiment.

With additional reference to FIG. 4, which is a block diagram illustrating a system for audio logging and onboard validation using an autonomous driving vehicle according to one embodiment, audio recorder 308 may communicate with an audio sensor 411 (e.g., microphone) from sensor system 115 to record or capture sound from the environment surrounding the ADV. For example, a user of the ADV may activate (turn on) audio recorder 308 through user interface system 113, and in response to the user's input to activate the audio recorder 308, audio recorder 308 may record the sound (e.g., a siren sound) emitted by an obstacle within the driving environment of the ADV (e.g., an emergency vehicle, such as a police vehicle, ambulance, fire truck, etc.) and convert it into audio samples/events 313 (e.g., an audio file of a suitable format). When sufficient audio data is recorded (e.g., a specific data size or elapsed time has reached), the user may deactivate (turn off) audio recorder 308, and audio samples/events 313 may be stored in persistent storage device 352.

Using the captured or record audio samples 313, the user may invoke audio data labelling module 309 (e.g., a data labelling tool or application) to manually label the audio samples 313. For example, audio data labelling module 309 can be used to tag or label audio samples 313 with an audio sample ID, one or more positions associated with audio samples 313 (e.g., a position of a sound source or obstacle), a direction associated with audio samples 313 (e.g., a relative direction of the sound source or obstacle), etc., and produce labelled audio data 314, which may be stored in persistent storage device 352 or on a remote server (e.g., server 103). Thus, labelled audio data 314 may include audio samples 313, an audio sample ID, one or more positions associated with audio samples 313, a direction associated with audio samples 313, etc. Auto refining module 310 may automatically refine labelled audio data 314 for machine learning. That is, labelled audio data 314 may need to be refined and standardized in a useable format before it can be fed into a machine learning model. For example, module 310 may perform obstacle cropping and/or rotation in order to refine the position(s) and/or direction of the sound source, and produce refined labelled audio data 126, which may be stored locally in persistent storage device 352 and/or uploaded onto a remote server (e.g., server 103). Thus, refined labelled audio data 126 may include audio samples 313, the audio sample ID, refined position(s) associated with audio samples 313, and/or a refined direction associated with audio samples 313. Data 126 may be used as input to machine learning engine 122 that generates or trains a set of rules, algorithms, and/or predictive models 124 for a variety of purposes, such as for motion planning and control.

Concurrently, audio samples/events 313 and refined labelled audio data 126 may be provided to profiling module 311 to generate a performance profile 315 for online performance. For example, profiling module 311 may communicate and/or operate with perception module 302 to determine and capture one or more positions and a relative direction of a sound source (or obstacle). As shown in FIG. 4, perception module 302 can communicate with one or more visual sensors 412 (e.g., a radar, camera(s), and/or LIDAR) from sensor system 115 to detect objects or obstacles based on sensors data provided by sensors 412 at different points in time. Using those sensors data, perception module 302 can determine a real-time relative position and direction of an object at any point in time. Based on the relative position and direction of the object and the input audio samples 313, profiling module 311 may profile or validate the online performance of refined labelled audio data 126 against real-time information (e.g., position(s) and direction of an obstacle) associated with the driving environment perceived by perception module 302, to generate performance profile 315. That is, profiling module 311 may use the relative position and direction of the object and the input audio samples 313 as reference information to compare and evaluate refined labelled audio data 126. The profiled performance data of refined labelled audio data 126 may be stored as part of performance profile 315, which may be stored locally in persistent storage device 352.

Figure 5:
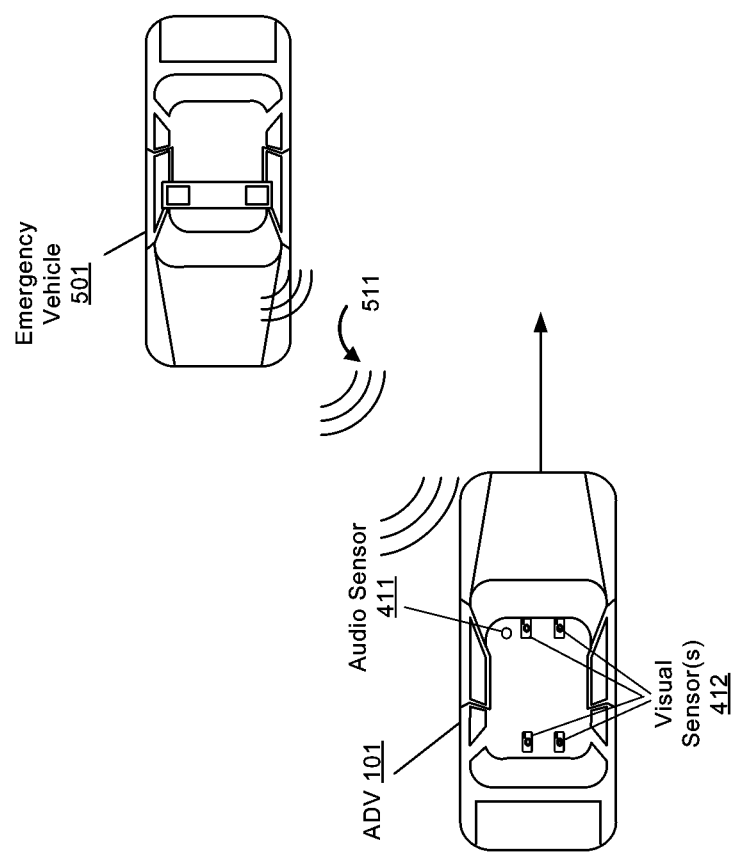
FIG. 5 is a diagram illustrating an example driving scenario with the use of the system for audio logging and onboard validation according to one embodiment.

FIG. 5 is a diagram illustrating an example driving scenario with the use of the system for audio logging and onboard validation according to one embodiment. Referring to FIG. 5, while ADV 101 is driving along a route, audio sensor 411 (e.g., a microphone) may detect siren sound 511 from emergency vehicle 501 (e.g., police vehicle, ambulance, fire truck, etc.) and record siren sound 511 as audio samples/events. Thus, emergency vehicle 501 is a sound source emitting siren sound 511.

The recorded audio samples/events may be manually labelled (e.g., using a data labelling application) with an audio sample ID, one or more positions associated with the audio samples (e.g., a position of vehicle 501), a direction associated the audio samples (e.g., a relative direction of vehicle 501), etc. As previously described, the labelled audio data may then be refined and standardized in a useable format before it can be fed into a machine learning model. For example, to refine the labelled audio data, obstacle cropping and/or rotation may be performed in order to refine the position(s) and/or direction associated with the audio samples. Subsequently, the refined labelled audio data may be fed into a machine learning engine that generates or trains a set of rules, algorithms, and/or predictive models 124 for a variety of purposes, such as for motion planning and control.

Simultaneously, the recorded audio samples/events may be provided to a profiling system (e.g., profiling module 311 of FIG. 4) to profile or analyze the performance of the refined labelled audio data against real-time visual sensors data. For instance, while ADV 101 is driving along a route, visual sensor(s) 412 (e.g., camera(s), radar, LIDAR) may detect emergency vehicle 501 within the driving environment of ADV 101. In response to detecting vehicle 501 in the driving environment, visual sensor(s) 412 may provide the positions of vehicle 501 (e.g., x, y, z coordinates) in different points in time. Based on the provided positions and a reference axis (x-axis) of ADV 101, perception system of ADV 101 can additionally determine a direction vector drawn from ADV 101 to vehicle 501. Based on the direction vector and the reference axis of ADV 101, a direction angle can be determined where the direction angle represents a relative direction of vehicle 501. The online performance of the refined labelled audio data may then be generated against the positions and relative direction of vehicle 501 and the recorded audio samples/events.

It is noted that while a single vehicle 501 is illustrated in FIG. 5, in other driving scenarios, multiple vehicles 501 may be used, with the system for audio logging and onboard validation being operated with those vehicles concurrently. Also, vehicle 501 may be stationary, moving toward ADV 101, or moving away from ADV 101. Similarly, ADV 101 may be stationary, moving toward vehicle 501, or moving away from vehicle 501.

Figure 6:
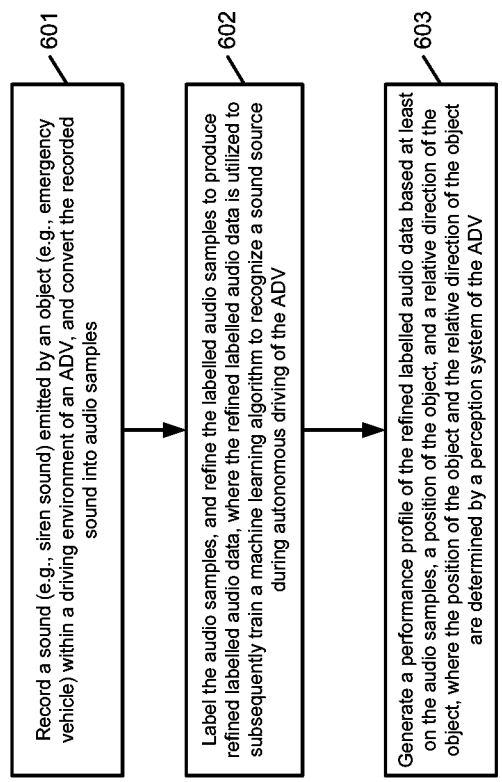
FIG. 6 is a flow diagram of a method of generating labelled audio data and onboard validation of the labelled audio data according to one embodiment.

FIG. 6 is a flow diagram of a method of generating labelled audio data and onboard validation of the labelled audio data according to one embodiment. In some embodiments, method 600 is performed by perception module 302, audio recorder 308, audio data labelling module 309, auto refining module 310, profiling module 311, and/or machine learning engine 122.

Referring to FIG. 6, at block 601, a sound (e.g., siren sound) emitted by an object (e.g., emergency vehicle) within a driving environment of an ADV is recorded, and converted into audio samples. At block 602, the audio samples are labelled, and the labelled audio samples are refined to produce refined labelled audio data, where the refined labelled audio data is utilized to subsequently train a machine learning algorithm to recognize a sound source during autonomous driving of the ADV. At block 603, a performance profile of the refined labelled audio data is generated based at least on the audio samples, a position of the object, and a relative direction of the object, where the position of the object and the relative direction of the object are determined by a perception system of the ADV.

Figure 7:
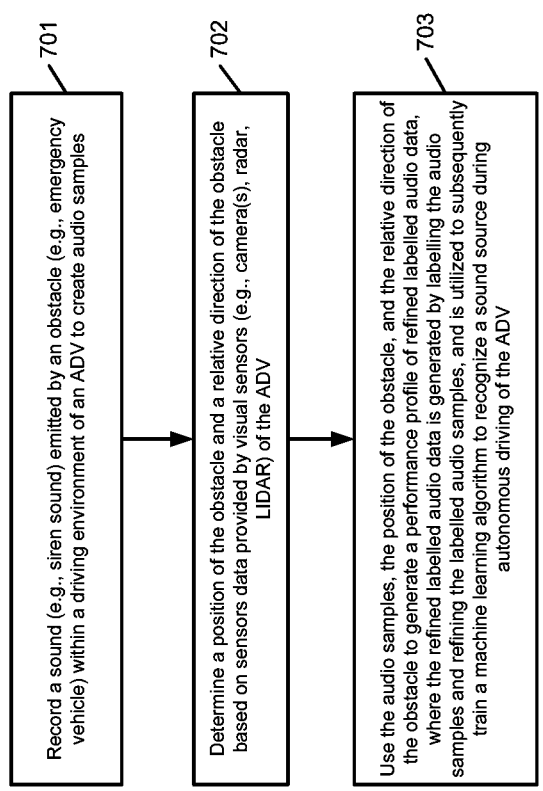
FIG. 7 is a flow diagram of a method of onboard validation of labelled audio data according to one embodiment.

FIG. 7 is a flow diagram of a method of onboard validation of labelled audio data according to one embodiment. Method or process 700 may be performed by processing logic which may include software, hardware, or a combination thereof. For example, process 700 may be performed by ADS 110 of FIG. 1.

Referring to FIG. 7, at block 701, the processing logic records a sound (e.g., siren sound) emitted by an obstacle (e.g., emergency vehicle) within a driving environment of an ADV to create audio samples. At block 702, the processing logic determines a position of the obstacle and a relative direction of the obstacle based on sensors data provided by visual sensors (e.g., camera(s), radar, LIDAR) of the ADV. At block 703, the processing logic uses the audio samples, the position of the obstacle, and the relative direction of the obstacle to generate a performance profile of refined labelled audio data, where the refined labelled audio data is generated by labelling the audio samples and refining the labelled audio samples, and is utilized to subsequently train a machine learning algorithm to recognize a sound source during autonomous driving of the ADV.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A method of generating labelled audio data and onboard validation of the labelled audio data utilizing an autonomous driving vehicle (ADV) while the ADV is operating within a driving environment, the method comprising:
   recording a sound emitted by an object within the driving environment of the ADV, and converting the recorded sound into audio samples;
   labelling the audio samples, and refining the labelled audio samples to produce refined labelled audio data, wherein the refined labelled audio data is utilized to subsequently train a machine learning algorithm to recognize a sound source during autonomous driving of the ADV; and
   generating a performance profile of the refined labelled audio data based at least on the audio samples, a position of the object, and a relative direction of the object, wherein the position of the object and the relative direction of the object are determined by a perception system of the ADV, wherein using the audio samples, the position of the object, and the relative direction of the object to generate the performance profile comprises profiling the refined labelled audio data against the audio samples, the position of the object, and the relative direction of the object.

2. The method of claim 1, wherein generating the performance profile of the refined labelled audio data further comprises determining the position of the object and the relative direction of the object based on sensors data provided by visual sensors of the ADV, wherein the visual sensors are coupled to the perception system.

3. The method of claim 1, wherein labelling the audio samples comprises tagging the audio samples with an audio sample identifier (ID), one or more positions associated with the audio samples, and a direction associated with the audio samples.

4. The method of claim 1, wherein the object is an emergency vehicle and the emitted sound is a siren sound.

5. The method of claim 1, wherein the audio samples are manually labelled by a user of the ADV.

6. The method claim 1, wherein the performance profile is stored locally in a persistent storage device in the ADV.

7. A computer-implemented method for onboard validation of labelled audio data utilizing an autonomous driving vehicle (ADV) while the ADV is operating within a driving environment, the method comprising:
   recording a sound emitted by an obstacle within the driving environment of the ADV to create audio samples;
   determining a position of the obstacle and a relative direction of the obstacle based on sensors data provided by visual sensors of the ADV; and
   using the audio samples, the position of the obstacle, and the relative direction of the obstacle to generate a performance profile of refined labelled audio data, wherein the refined labelled audio data is generated by labelling the audio samples and refining the labelled audio samples, and is utilized to subsequently train a machine learning algorithm to recognize a sound source during autonomous driving of the ADV, wherein using the audio samples, the position of the obstacle, and the relative direction of the obstacle to generate the performance profile comprises profiling the refined labelled audio data against the audio samples, the position of the obstacle, and the relative direction of the obstacle.

8. The method of claim 7, wherein the labelled audio samples comprise the audio samples, an audio sample identifier (ID), one or more positions associated with the audio samples, and a direction associated with the audio samples.

9. The method of claim 7, wherein the obstacle is an emergency vehicle and the emitted sound is a siren sound.

10. The method of claim 7, wherein the audio samples are manually labelled by a user of the ADV.

11. The method of claim 7, wherein the performance profile is stored locally in a persistent storage device in the ADV.

12. A system for onboard validation of labelled audio data, comprising:
   a processor; and
   a memory coupled to the processor to store instructions, which when executed by the processor, cause the processor to perform operations, the operations including
   recording a sound emitted by an obstacle within a driving environment of an autonomous driving vehicle (ADV) to create audio samples;
   determining a position of the obstacle and a relative direction of the obstacle based on sensors data provided by visual sensors of the ADV; and
   using the audio samples, the position of the obstacle, and the relative direction of the obstacle to generate a performance profile of refined labelled audio data, wherein the refined labelled audio data is generated by labelling the audio samples and refining the labelled audio samples, and is utilized to subsequently train a machine learning algorithm to recognize a sound source during autonomous driving of the ADV, wherein using the audio samples, the position of the obstacle, and the relative direction of the obstacle to generate the performance profile comprises profiling the refined labelled audio data against the audio samples, the position of the obstacle, and the relative direction of the obstacle.

13. The system of claim 12, wherein the labelled audio samples comprise the audio samples, an audio sample identifier (ID), one or more positions associated with the audio samples, and a direction associated with the audio samples.

14. The system of claim 12, wherein the obstacle is an emergency vehicle and the emitted sound is a siren sound.

15. The system of claim 12, wherein the audio samples are manually labelled by a user of the ADV.

16. The system of claim 12, wherein the performance profile is stored locally in a persistent storage device in the ADV.

17. A non-transitory machine-readable medium having instructions stored therein, which when executed by a processor of an autonomous driving vehicle (ADV), cause the ADV to perform operations, the operations comprising:
  recording a sound emitted by an obstacle within the ADV to create audio samples;
  determining a position of the obstacle and a relative direction of the obstacle based on sensors data provided by visual sensors of the ADV; and
using the audio samples, the position of the obstacle, and the relative direction of the obstacle to generate a performance profile of refined labelled audio data, wherein the refined labelled audio data is generated by labelling the audio samples and refining the labelled audio samples, and is utilized to subsequently train a machine learning algorithm to recognize a sound source during autonomous driving of the ADV, wherein using the audio samples, the position of the obstacle, and the relative direction of the obstacle to generate the performance profile comprises profiling the refined labelled audio data against the audio samples, the position of the obstacle, and the relative direction of the obstacle.

18. The non-transitory machine-readable medium of claim 17, wherein the labelled audio samples comprise the audio samples, an audio sample identifier (ID), one or more positions associated with the audio samples, and a direction associated with the audio samples.

19. The non-transitory machine-readable medium of claim 17, wherein the obstacle is an emergency vehicle and the emitted sound is a siren sound.

20. The non-transitory machine-readable medium of claim 17, wherein the audio samples are manually labelled by a user of the ADV.

21. The non-transitory machine-readable medium of claim 17, wherein the performance profile is stored locally in a persistent storage device in the ADV.

* * * * *